(12) United States Patent
Bader et al.

(10) Patent No.: US 11,915,864 B2
(45) Date of Patent: Feb. 27, 2024

(54) MAGNETIC RETAINING DEVICE

(71) Applicant: Berndorf Band GmbH, Berndorf (AT)

(72) Inventors: Dieter Bader, Berndorf (AT);
Maximilian Prunbauer, Vienna (AT);
Gerald Firmberger, Vienna (AT)

(73) Assignee: Berndorf Band GmbH, Berndorf (AT)

( * ) Notice: Subject to any disclaimer, the term of this patent is extended or adjusted under 35 U.S.C. 154(b) by 763 days.

(21) Appl. No.: 16/961,604

(22) PCT Filed: Jan. 11, 2018

(86) PCT No.: PCT/AT2018/060009
§ 371 (c)(1),
(2) Date: Jul. 10, 2020

(87) PCT Pub. No.: WO2019/136500
PCT Pub. Date: Jul. 18, 2019

(65) Prior Publication Data
US 2020/0388422 A1    Dec. 10, 2020

(51) Int. Cl.
*H01F 7/02* (2006.01)
*B23Q 1/52* (2006.01)
*B23Q 3/154* (2006.01)

(52) U.S. Cl.
CPC .............. *H01F 7/0252* (2013.01); *B23Q 1/52* (2013.01); *B23Q 3/1546* (2013.01)

(58) Field of Classification Search
CPC ........ H01F 7/0252; B23Q 1/52; B23Q 3/1546
See application file for complete search history.

(56) References Cited

U.S. PATENT DOCUMENTS

| | | | | |
|---|---|---|---|---|
| 2,286,238 A | * | 6/1942 | Simmons | B23Q 3/1546 335/295 |
| 3,812,629 A | * | 5/1974 | Campbell | B23Q 3/152 451/364 |
| 6,707,360 B2 | | 3/2004 | Underwood et al. | |
| 7,102,476 B1 | * | 9/2006 | Shen | B23Q 3/1546 335/295 |
| 2014/0314507 A1 | * | 10/2014 | Timmons | B23Q 3/1546 408/76 |
| 2016/0001439 A1 | * | 1/2016 | Timmons | B23Q 3/1546 408/76 |

FOREIGN PATENT DOCUMENTS

| | | |
|---|---|---|
| AT | 403894 B | 6/1998 |
| CN | 105345565 A | 2/2016 |

(Continued)

OTHER PUBLICATIONS

The translation of document CN 106141525 A.*

*Primary Examiner* — Mohamad A Musleh
(74) *Attorney, Agent, or Firm* — Stoel Rives LLP (57) ABSTRACT

The invention relates to a magnetic holding device (10), in particular a clamping device, comprising a holding surface (9) and at least one first permanent magnet (11), characterized in that the holding device (10) comprises at least one second permanent magnet (12) which is rotatably mounted relative to the at least one first permanent magnet (11) about a rotational axis (3), whereby the pole direction (2) of the second permanent magnet (12) is rotatable relative to the pole direction (1) of the first permanent magnet (11).

28 Claims, 9 Drawing Sheets

(56) References Cited

FOREIGN PATENT DOCUMENTS

| | | | | |
|---|---|---|---|---|
| CN | 106141525 | A | 11/2016 | |
| CN | 106826330 | A | 6/2017 | |
| CN | 1402876 | A | 3/2023 | |
| DE | 971096 | C | 12/1958 | |
| DE | 2931539 | A1 | 2/1981 | |
| DE | 19745930 | A1 | 4/1999 | |
| FR | 2308177 | A1 | 11/1976 | |
| GB | 563333 | A | 8/1944 | |
| GB | 785246 | A * | 10/1957 | |
| JP | S60150930 | A | 8/1985 | |
| KR | 100602514 | B1 | 7/2006 | |
| WO | 2012144769 | A1 | 10/2012 | |
| WO | WO-2012144769 | A1 * | 10/2012 | ........... B23Q 3/1546 |
| WO | 2015071878 | A1 | 5/2015 | |

\* cited by examiner

MAGNETIC RETAINING DEVICE

RELATED APPLICATIONS

This application is a national stage under 35 U.S.C. § 371 of International Application No. PCT/AT2018/060009, filed Jan. 11, 2018.

The invention relates to a magnetic holding device, in particular a clamping device, comprising a holding surface, at least one first permanent magnet and at least one second permanent magnet; and a machining device.

DE19745930A1 discloses a magnetic clamping device for blanks of ferromagnetic steel sheet to be welded together. The steel sheet is clamped to a clamping plate by the force of a permanent magnet. The permanent magnet is adjustable from its clamping position to a retracted neutral position by means of an actuator in the form of a cylinder-piston unit. In this position the force exerted by the permanent magnet on the holding surface of the clamping plate is too small to hold the blank. The principle of this solution is that the distance between the magnet and the sheet metal is changed. The disadvantage of this solution, however, is that the movable permanent magnet adheres to the sheet metal during clamping and is retracted in the direction facing away from the sheet metal for release. However, before the magnet finally separates from the sheet metal, the sheet metal will give way. This discontinuous process can lead to a local, possibly irreversible deformation of the sheet metal, which has a negative effect especially with small sheet thicknesses.

AT403894B discloses a device for electromagnetic clamping and joining, especially welding of sheet metal. The device comprises clamping elements with a switchable electromagnet and with a holding surface, as well as a counter-pressure element (called armature). The sheet metal is clamped between the holding surface and the counter-pressure element. The disadvantage of the known electromagnets, however, is that they are relatively heavy and therefore the logistics and transport of the known equipment is complex. Also, the control effort is relatively high with the known magnets. Furthermore, electromagnets have an electrical resistance, which leads to heat loss. To ensure constant conditions, the known electromagnets must be cooled. If there is a large gap between the magnet and the sheet metal to be fixed and therefore a large force must be generated, the thermal power must also be increased.

CN106141525A discloses a clamping device comprising a first and second magnet arrangement formed of permanent magnets, the second magnet arrangement being linearly displaceable relative to the first magnet arrangement. Relative movement of the magnet arrangements causes the magnetic holding force to change. In one relative position, permanent magnets with the same pole direction are arranged next to each other, resulting in a high holding force. In another relative position, permanent magnets with opposite pole directions are arranged next to each other. Due to their opposite pole directions, the permanent magnets "deactivate" each other. The disadvantage of the clamping device shown in CN106141525A is that it does not work properly in practice. On the one hand, the reproducibility of the holding force could not be achieved to the expected extent. On the other hand, a continuous increase of the holding force is not possible because the magnet arrangement jumps from the release position to the holding position due to the strong magnetic fields. De facto only two switching states were possible with such a clamping device, namely: holding or non-holding. In addition, such a clamping device requires a plurality of permanent magnets and therefore a priori has a high space demand, which increases further due to the movement of the second magnet arrangement at the ends of the arrangement, i.e. in the displacement direction. The requirements on the displacement mechanism are very high, both in terms of the force to be provided and the continuous forward and backward movement. Finally, such an arrangement proved to be cost-intensive and susceptible to wear.

The invention aims to eliminate the disadvantages of the state of the art and to provide a magnetic holding device which, on the one hand, does not require electromagnets, thus a priori avoiding a thermal load on the holding device and its environment as well as on the workpiece retained by the holding device, and which, on the other hand, functions without undesired mechanical effects on the workpiece to be retained. Furthermore, the reproducibility of the holding force as well as the continuous increase or decrease of the holding force should be guaranteed. Furthermore, the possibility of adjusting the holding force as required should be provided. Instead of only two switching states, the holding force should be continuously adjustable. The holding device should also be as space-saving, cost-effective and low-wear as possible.

The object is solved with a holding device of the above-mentioned type in that the at least one second permanent magnet is rotatably mounted relative to at least one first permanent magnet about a rotational axis, whereby the pole direction of the second permanent magnet is rotatable relative to the pole direction of the first permanent magnet.

Rotating the second permanent magnet relative to the first permanent magnet allows the angle between the pole direction of the second permanent magnet and the pole direction of the first permanent magnet to change continuously. The holding force provided by the holding surface depends on this angle and can therefore be adjusted as required by changing the relative rotational position. The invention therefore refers to an adjustable magnetic holding device with—preferably continuously—variable holding force.

The smaller the angular deviation of the pole direction of the second permanent magnet from that of the first permanent magnet (i.e. when the first pole direction and the second pole direction point in essentially the same direction), the stronger the holding force. Here, the magnetic flux lines of the permanent magnets close primarily outside the holding surface. They therefore run in an area in which an object to be retained is positioned and/or a counter-pressure element (e.g. made of soft magnetic material) is arranged. In such a first relative rotational position (no or slight angular deviation between the pole directions) the holding device is thus in a holding or clamping or activated state.

With opposite pole directions, a magnetic short circuit is created between the second permanent magnet and the first permanent magnet. In other words: due to their different, especially opposite pole directions, the permanent magnets "deactivate" each other at least to a certain extent. The magnetic short circuit prevents magnetic flux from passing through the holding surface to a sufficient extent. In such a second relative position, the holding device is thus in a released or deactivated state.

The invention not only increases reproducibility, i.e. a defined holding force depending on the respective angle of rotation, but also makes it possible to adjust the holding force to a specific value according to requirements.

The pole direction is the direction from one pole of the permanent magnet (e.g. south pole) to the other pole of the permanent magnet (e.g. north pole).

Naturally, in one embodiment of the invention, both permanent magnets can also be rotatably mounted.

The advantage of the invention consists in particular in the fact that the holding device can be brought not only from a deactivated to an activated state by means of a relative rotation between the permanent magnets, but can be reproducibly brought to any desired intermediate state. The holding force acting on the object to be retained can thereby be continuously changed. Different relative positions cause different holding forces. The holding device can be designed in such a way that the condition of the holding surface is independent of the relative movement of the magnet arrangements, i.e. the holding surface as such remains unchanged. In contrast, the holding surface of the DE19745930A1 changes when the permanent magnet is withdrawn leading to the problems mentioned above.

The holding device is used for holding or (clamping) objects, especially workpieces. An important field of application of the holding device according to the invention are machining devices for machining workpieces, in particular flat workpieces such as sheet metals, strips and the like. The workpiece is fixed or clamped by the holding device during a machining process (e.g. welding, cutting, milling, joining with another piece, etc.). The invention thus also relates to a machining device for machining workpieces, which comprises a holding device according to the invention.

Preferably the permanent magnets are rare earth magnets, especially neodymium magnets, preferably with magnetic field strengths of more than 1 Tesla each.

A preferred embodiment is characterized in that the holding device comprises at least two, preferably a plurality of first permanent magnets and at least two, preferably a plurality of second permanent magnets, wherein the second permanent magnets are each rotatably mounted relative to the first permanent magnets about a rotational axis, thereby making it possible to vary the pole directions of the second permanent magnets relative to the pole directions of the first permanent magnets by rotation. In this way, the principle according to the invention can be spatially extended, whereby larger holding surfaces with relatively even distribution of force can be realized. Of particular interest with this variant is the possibility of adjusting the holding force depending on the position along the holding surface. This is because the second permanent magnets do not have to be twisted to the same extent, but can also be adjusted individually. In this way, different high holding forces can be set for different areas of the holding surface. This may be required, for example, if an inhomogeneous workpiece (e.g. an uneven weight distribution) has to be retained.

A preferred embodiment is characterized in that the first permanent magnets and the second permanent magnets are arranged alternately along one direction, preferably with the rotational axes of the second permanent magnets parallel to each other. This means that a first permanent magnet is followed by a second permanent magnet and the second permanent magnet is followed by a first permanent magnet, and so on. A first permanent magnet and a second permanent magnet can be regarded as a functional unit which is adjustable independently of other such units.

A preferred embodiment is characterized in that the permanent magnets are arranged one after the other— preferably directly one after the other—along a direction parallel to the holding surface. In this way, a magnetic short circuit with as few gaps as possible can be created with opposite pole directions, whereas with the same pole directions, maximum amplification of the flux passing through the holding surface and thus of the holding force is achieved.

A preferred embodiment is characterized in that the at least one second permanent magnet is rotatable relative to the at least one first permanent magnet by at least 90°, preferably by at least 180°, particularly preferred by at least 360°. This provides—depending on the application—a sufficient degree to which the first pole direction and the second pole direction are rotatable against each other. It is particularly preferred if the second permanent magnet(s) are rotatable around the rotational axis by more than 360° or without restriction—i.e. in endlessly repeatable rotations (without reversing the rotational direction). When actuated by a rotary actuator, it could also be designed to rotate in only one direction.

A preferred embodiment is characterized in that the pole direction of the at least one first permanent magnet and the pole direction of the at least one second permanent magnet point in the same direction in a first relative rotational position and in opposite directions in a second relative rotational position. Maximum holding force is provided in the first relative rotational position and minimum or no holding force is provided in the second relative rotational position.

A preferred embodiment is characterized in that the rotational axis of the at least one second permanent magnet is transverse, preferably substantially perpendicular to the holding surface. In addition to a space-saving design, the magnetic flux (which can be changed by rotation) can be converted most efficiently into a holding force.

A preferred embodiment is characterized in that the rotational axis of the at least one second permanent magnet is transverse, preferably substantially perpendicular, to the pole direction of the at least one second permanent magnet. In this way, a maximum change in the magnetic flux is achieved by rotating a second permanent magnet.

A preferred embodiment is characterized in that the rotational axis of the at least one second permanent magnet passes through the second permanent magnet, preferably coinciding with an axis of the second permanent magnet. In this way the bearing of the second permanent magnet requires very little space, regardless of its relative rotational position.

A preferred embodiment is characterized in that in a first relative rotational position, same-named poles of the at least one first permanent magnet and the at least one second permanent magnet are closer to one another than in a second relative rotational position. The closer the same-named poles are, the higher the holding force.

A preferred embodiment is characterized in that the at least one first permanent magnet is arranged in non-rotatably relative to the holding surface and the at least one second permanent magnet is arranged rotatably relative to the holding surface. The arrangement or attachment of the first permanent magnets can thus be carried out very easily and cost efficiently.

As mentioned above, at least one first permanent magnet could be mounted rotatably (relative to the holding surface).

A preferred embodiment is characterized in that the pole direction of the at least one first permanent magnet and the pole direction of the at least one second permanent magnet, preferably in all relative rotational positions, are substantially parallel to the holding surface and/or that the permanent magnets are designed in the form of plates or discs which are substantially perpendicular to the holding surface. This enables a particularly space-saving design, especially in the direction perpendicular to the holding surface. The permanent magnets can be arranged one after the other in a direction parallel to the holding surface.

In a preferred embodiment, the pole faces of the at least one first permanent magnet and/or the pole faces of the at least one second permanent magnet are essentially perpendicular to the holding surface. By enlarging the magnetic pole faces, the holding force can be increased without having to increase the holding surface itself.

In a preferred embodiment, the pole face of a permanent magnet is always larger than, preferably at least twice as large as, the projection area resulting from normal projection of the permanent magnet onto the holding surface.

The holding force of a magnetically traversed pole or holding surface is essentially given in Newtons per cm² [N/cm²] as ($40 \times B^2$), where B is the magnetic flux density in Tesla. Since the maximum remanence of permanent magnets is limited to about 1.4 Tesla and can usually only be assumed to be 0.8 Tesla at real magnetic resistances and losses, the maximum achievable force density is $40 \times 0.8^2 = 26$ N/cm². By enlarging the holding surface, any holding force can be achieved. If the available area is limited (as is usually the case with holding devices), the magnetic flux density must be increased to increase the holding force. This can be accomplished, for example, by pole shoes made of soft magnetic iron to 1.7 Tesla. This allows a force density of $40 \times 1.7^2 = 115$ N/cm² to be achieved. By arranging the magnetic pole faces perpendicular to the holding surface, it is possible to increase the pole faces of the permanent magnets without having to change the holding surfaces.

A preferred embodiment is characterized in that at least one pole shoe extends continuously (i.e. without magnetically insulating interruptions such as air gaps or separations of non-magnetic material) along the arrangement of the permanent magnets, wherein preferably one pole shoe each extends continuously on both sides of the arrangement of the permanent magnets. The pole shoe(s) formed of soft magnetic material is/are continuous, i.e. have no magnetically insulating interruptions (e.g. air gaps, separations of non-magnetic material). They therefore contribute significantly to the mechanical stability of the holding device or holding surface. A limitation of the holding force or the zeroing of the holding force in a certain area along the arrangement of the permanent magnets can be realized by means of permanent magnets that can be actuated independently of each other.

A preferred embodiment is characterized in that the at least one pole shoe extends continuously (i.e. without magnetically insulating interruptions) along the entire arrangement of the permanent magnets. This embodiment offers maximum stability due to the pole shoes along the entire holding surface.

A preferred embodiment is characterized in that the holding device comprises at least one actuator, in particular a motor, with which the at least one second permanent magnet is rotatable relative to at least one first permanent magnet. This enables automatic control and approaching a defined rotational position.

A preferred embodiment is characterized in that the second permanent magnets are rotatable independently of each other, preferably by independently controllable actuators, or that the second permanent magnets are coupled together and are rotatable synchronously, preferably by a common actuator. Independent control of the second permanent magnets makes it possible—as already mentioned—to set different holding forces for different areas of the holding surface.

A preferred embodiment is characterized in that the permanent magnets are arranged, preferably in their entirety, inside a housing, which preferably is formed in the shape of a block. This shields the magnets from external influences to the greatest possible extent.

A preferred embodiment is characterized in that the holding device has at least one rotatably mounted holder which holds a second permanent magnet, wherein preferably the holder is inserted in a cylindrical receptacle of the holding device. The second permanent magnet is rotated here by rotating the holder.

A preferred embodiment is characterized in that at least one holder supports a field-shaping section of soft magnetic material which is arranged next to the second permanent magnet. In this way the field lines are formed in an optimum manner and in a small space, in particular in the first relative rotational position the field lines are "guided" by the holding surface, while in the second relative rotational position the field lines are "guided" from the first permanent magnet to the second permanent magnet in order to create a magnetic short circuit.

A preferred embodiment is characterized in that the at least one holder is accessible from a side of the holding device facing away from the holding surface. This side can also be connected to an actuator for rotating the second permanent magnet(s).

A preferred embodiment is characterized in that the holding device is a clamping device for clamping a preferably sheet metal shaped object and comprises a counter-pressure element having a counter-pressure surface facing the holding surface, wherein preferably the counter-pressure element is formed of soft magnetic material and/or comprises a magnet.

A preferred embodiment is characterized in that the holding device comprises a clamping profile with two preferably obliquely projecting legs. The leg ends facing the object to be retained provide a locally increased clamping force in order to fix the object particularly reliably, especially in the working area of a machining tool. The clamping profile can, for example, have a U-shaped cross-section, whereby the legs and a back of the clamping profile form the legs and base of an open trapezoid.

A preferred embodiment is characterized in that the clamping profile is formed on the counter-pressure element, the counter-pressure surface preferably being set back in the direction of its surface normal relative to the ends of the legs, preferably by at most 1 mm, particularly preferably by at most 0.5 mm. When the counter element is pressed against the object (in particular a sheet or strip-shaped workpiece)—caused by the magnetic force of the magnetic composite formed by the magnet arrangements—the legs are initially slightly deformed before the counter-pressure surface abuts against the object. A higher force is therefore applied to the object in the area of the legs.

A preferred embodiment is characterized in that the magnet composite formed by the permanent magnets is arranged asymmetrically with respect to the clamping profile, the distance of the magnet composite to one leg of the clamping profile being greater, preferably 20% greater, than the distance of the magnet composite to the other leg. In this way it can be achieved in an elegant way that the force exerted by one leg on the object to be retained is greater than the force exerted by the other leg. A higher force (and thus more reliable fixing) may be necessary in the machining area of a machining tool.

The invention also relates to a machining device for machining preferably sheet- or strip-shaped workpieces, in particular for welding, cutting or milling, the machining device having at least one machining tool (in particular welding head, laser machining head, milling tool and/or cutting tool) and at least one holding device according to the invention for temporarily fixing a workpiece preferably in the working area of the machining tool.

For a better understanding of the invention, it is explained in more detail by means of the following figures.

They each show a highly simplified, schematic representation.

As an introduction, it should be noted that in the differently described embodiments, same parts are provided with the same reference signs or the same component designations, whereby the disclosures contained in the entire description can be transferred analogously to identical parts with the same reference signs or the same component designations. Also, the positional information selected in the description, e.g. top, bottom, side, etc., are related to the directly described and displayed figure and this positional information must be transferred to the new position in case of a change of position.

The embodiment examples show possible embodiment variants of the holding device, whereby it should be noted at this point that the invention is not restricted to the specially illustrated embodiment variants of the holding device, but rather that various combinations of the individual embodiment variants are possible and that this possibility of variation, based on the teachings of technical action by means of the objective invention, lies in the skill of the person skilled in this technical field.

Furthermore, individual features or combinations of features from the different embodiment examples shown and described can also represent independent, inventive solutions or solutions according to the invention.

The object underlying the independent inventive solutions can be taken from the description.

All information on value ranges in the present description should be understood to include any and all sub-ranges thereof, e.g. the information 1 to 10 is to be understood to include all sub-ranges starting from the lower limit 1 and the upper limit 10, i.e. all sub-ranges start with a lower limit of 1 or greater and end with an upper limit of 10 or less, e.g. 1 to 1.7, or 3.2 to 8.1, or 5.5 to 10.

Figure 1:
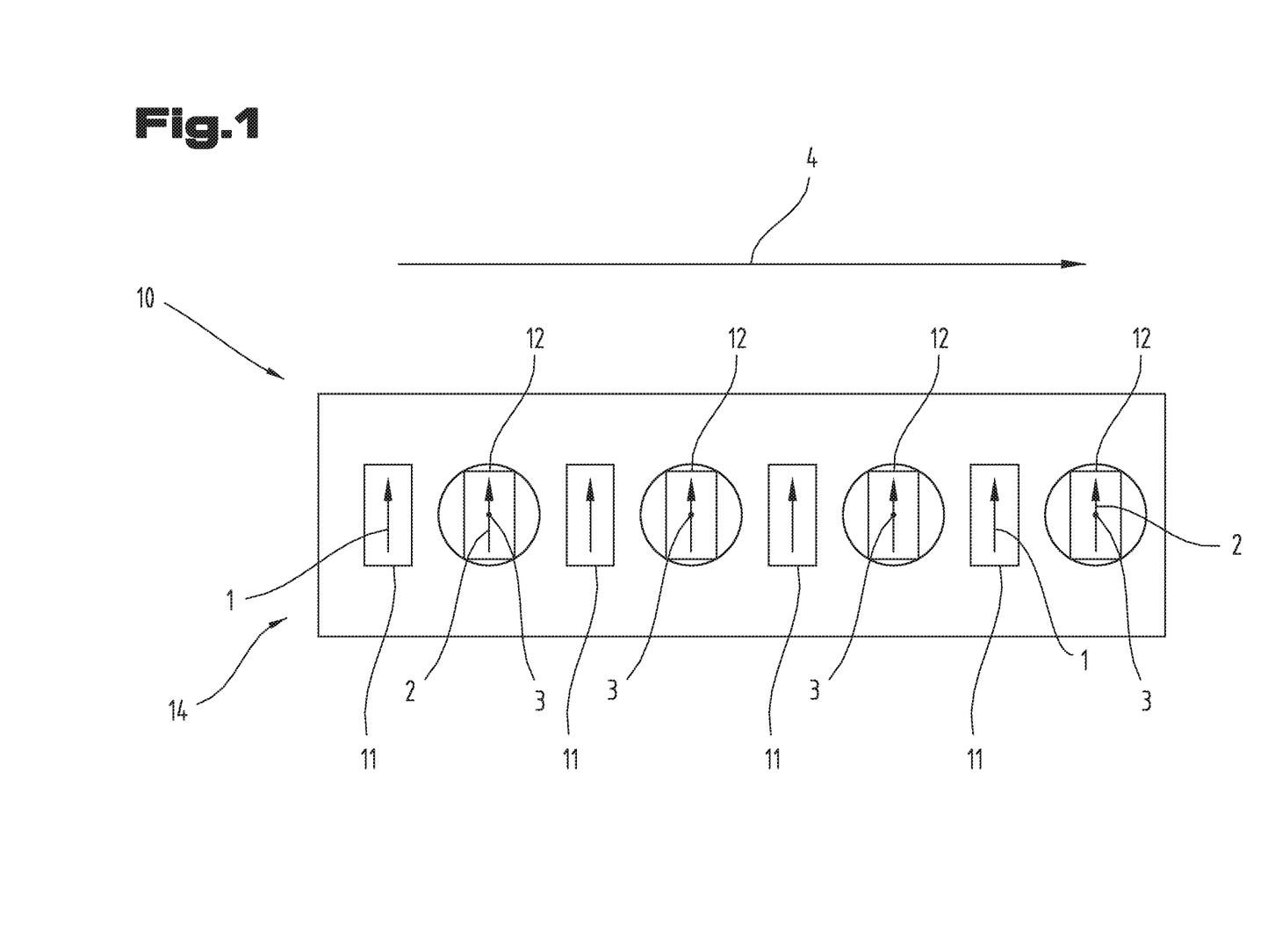
FIG. 1 a holding device in section parallel to the holding surface in a first relative rotational position of the second permanent magnets (high holding force)
Figure 2:
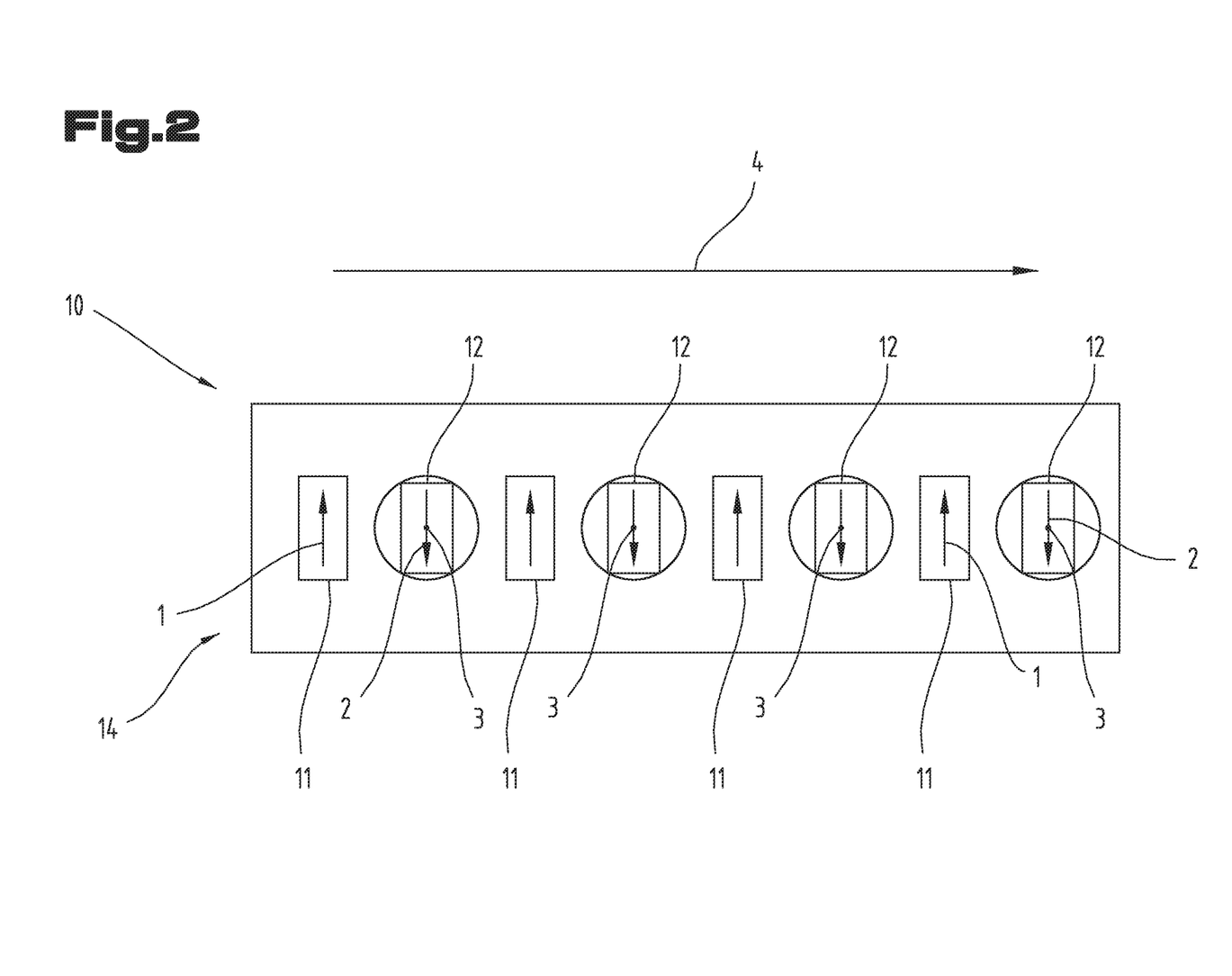
FIG. 2 the holding device of FIG. 1 in a second relative rotational position of the second permanent magnets (no or low holding force)
Figure 3:
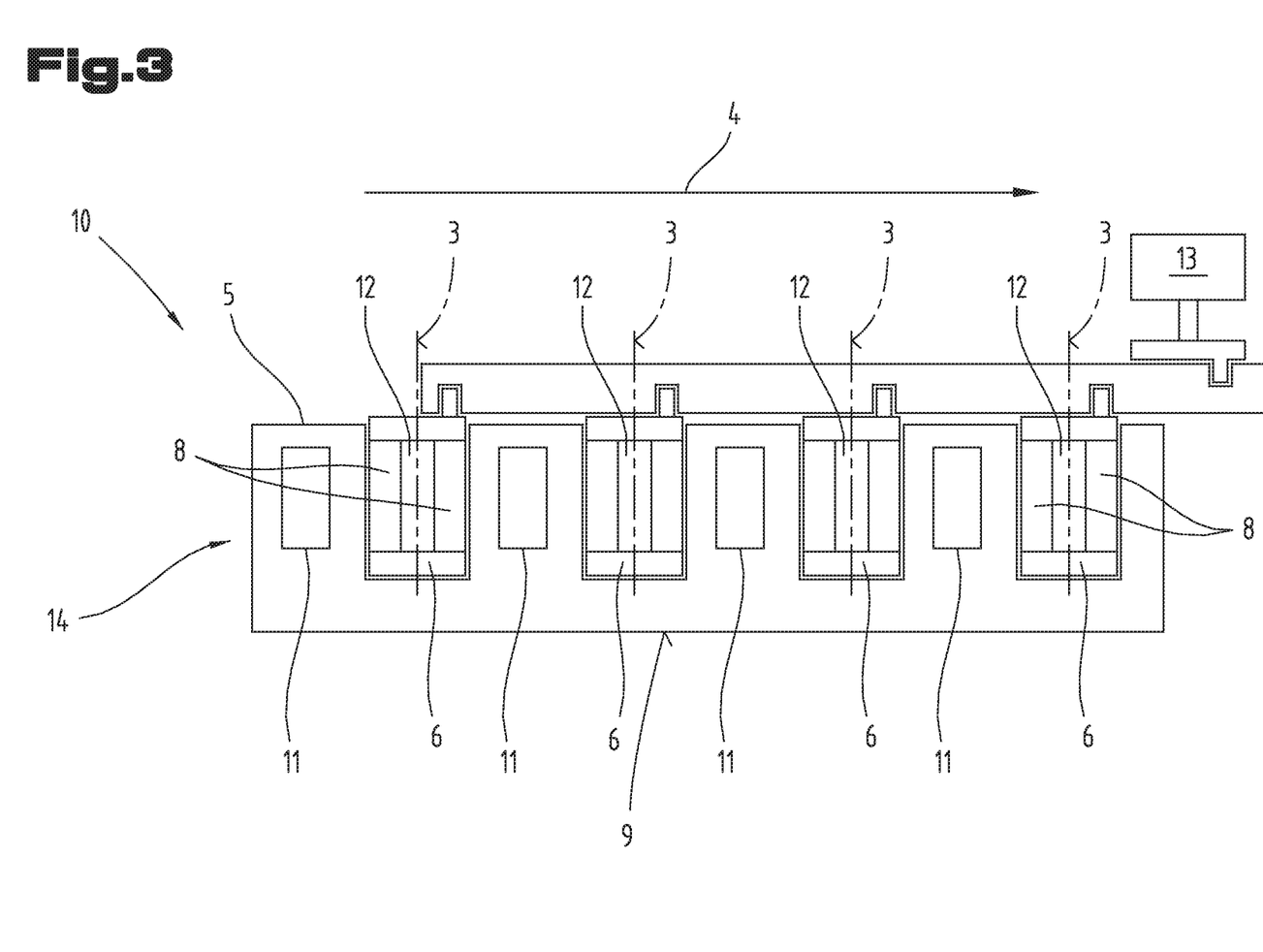
FIG. 3 the holding device in section perpendicular to the holding surface.

FIGS. 1 to 3 show a particularly preferred embodiment example of a holding device according to the invention for holding or clamping an object, especially a workpiece. The sectional view of FIG. 1 shows the holding device in the holding or activated state: the holding force is so high that an object can be retained or fixed directly or by means of a counter-pressure element. FIG. 2, on the other hand, shows the released or deactivated state: the holding force is not sufficient to hold or clamp an object.

FIG. 1 shows a sectional view of an adjustable or switchable magnetic holding device 10 parallel to its holding surface 9 (see FIG. 3) with first permanent magnets 11 and second permanent magnets 12. The second permanent magnets 12 are each rotatably mounted about a rotation axis 3 relative to the first permanent magnets 11. Thus, the pole directions 2 of the second permanent magnets 12 are rotatable relative to the pole directions 1 of the first permanent magnets 11. In the first relative rotational position shown in FIG. 1, the pole directions 1 of the first permanent magnets 11 and the pole directions 2 of the second permanent magnets 12 point in the same direction (parallel alignment).

In FIG. 2 (releasing state) the second permanent magnets 12 or their pole directions 2—in comparison to FIG. 1 (holding state)—are rotated by 180°. In this second relative rotational position the pole directions 1, 2 show opposite directions (anti-parallel alignment).

It is advantageous if, in the first relative rotational position, same-named poles (arrow heads or ends of arrows) of the at least one first permanent magnet 11 and the at least one second permanent magnet 12 are closer to each other (FIG. 1) than in the second relative rotational position (FIG. 2).

Of course, the principle also only works with a first and a second permanent magnet, but it is advantageous to provide a plurality of first and second permanent magnets to generate a uniform holding force and for large holding surfaces. Every second permanent magnet can have its own rotational axis.

As can be seen in FIGS. 1 to 3, the first permanent magnets 11 and the second permanent magnets 12 are arranged along a direction 4 one after the other and alternating in each case. The direction 4 extends parallel to the holding surface. The rotational axes 3 of the second permanent magnets 12 are preferably parallel to each other.

In the present arrangement, a rotation of the second permanent magnets 12 by 180° is provided between the (maximum) holding and the releasing state. It would also be conceivable to have smaller rotation angles, e.g. 90°, if the holding force should not exceed certain strength or if the first permanent magnets 11 are also rotatable and contribute to the relative movement through their own rotation. It is particularly preferred if the second permanent magnets are rotatable by at least 360° or even unlimited in one direction.

As shown in FIG. 3, the rotation axes 3 of the second permanent magnets 12 are transverse (here: essentially perpendicular) to the holding surface 9.

Furthermore, the rotational axes 3 of the second permanent magnets 12 are transverse (here: essentially perpendicular) to their respective pole directions 2.

Furthermore, it is advantageous if—as shown in FIG. 3—the rotational axes 3 of the second permanent magnet 12 pass through the second permanent magnet 12, preferably coinciding with an axis (e.g. longitudinal axis) of the second permanent magnet 12.

In the embodiments shown, the first permanent magnets 11 are arranged non-rotatably relative to the holding surface 9 and the second permanent magnets (12) are arranged rotatably relative to the holding surface (9).

It is preferred if the pole direction 1 of the first permanent magnet(s) 11 and the pole direction 2 of the second permanent magnet(s) 12 are essentially parallel to the holding surface 9 in all relative rotational positions. The permanent magnets 11, 12 can be in the form of plates or discs which are essentially perpendicular to the holding surface 9.

Figure 7:
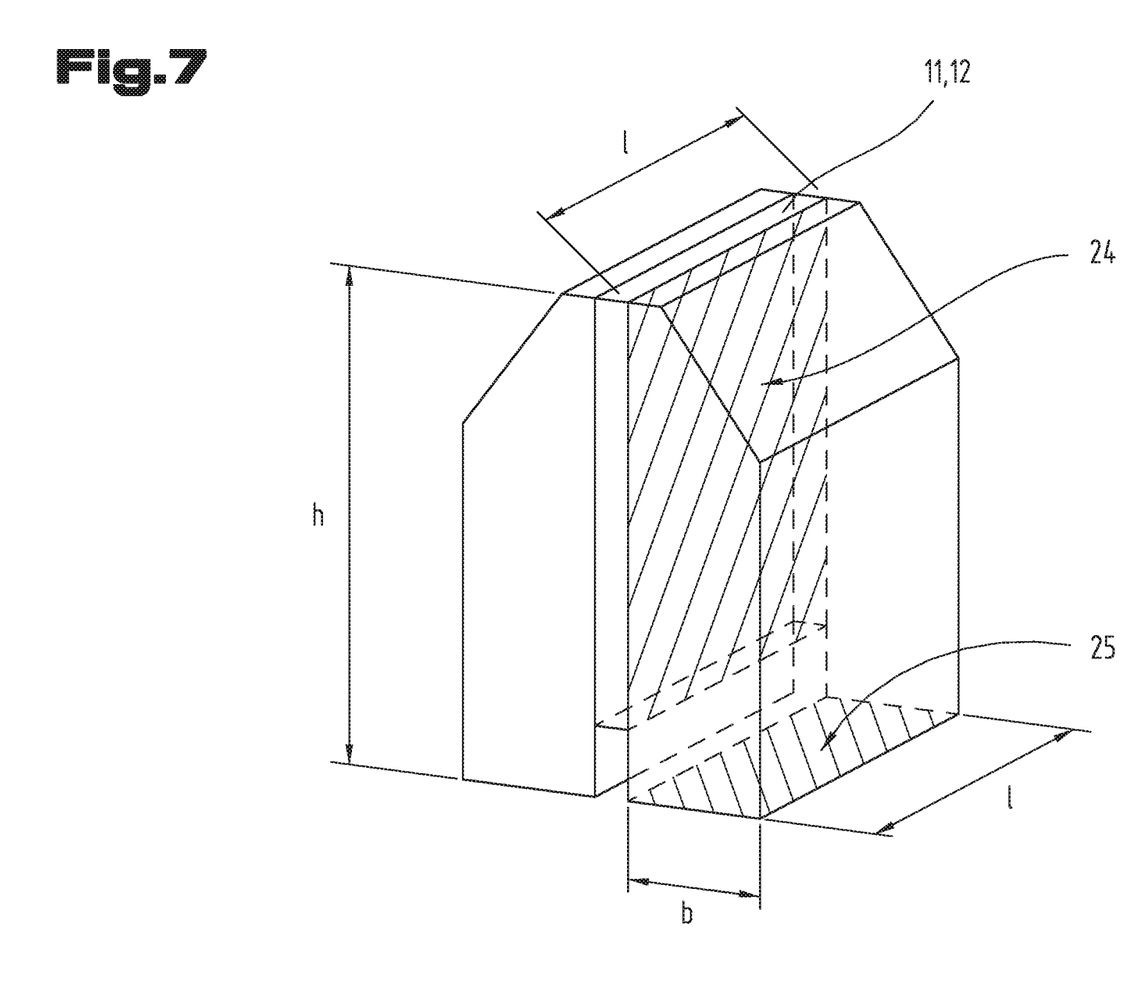

FIG. 7 shows a preferred dimensioning of a permanent magnet 11, 12 with the pole faces 24 (hatched vertical area in FIG. 7) in the permanent magnet 11, 12 each being essentially perpendicular to the holding surface 9 (horizontal area in FIG. 7). It is particularly preferred if the pole face 24 of a permanent magnet 11, 12 is larger than, preferably at least twice as large as, the projection area 25 (hatched horizontal area in FIG. 7) resulting from normal projection of the permanent magnet 11, 12 onto the holding area 9.

FIG. 3 shows that the holding device 10 may comprise at least one actuator 13, in particular a motor, with which the second permanent magnet(s) 12 is/are rotatable relative to the at least one first permanent magnet 11.

The second permanent magnets 12 are rotatable independently of each other, preferably by independently controllable actuators (not shown), or coupled together and rotated synchronously, preferably by a common actuator 13 (FIG. 3).

The permanent magnets 11, 12 can be arranged, preferably in their entirety, within a housing 5, which is preferably designed in the form of a block (FIG. 3).

The holding device 10 can have pivoted holders 6, each holding a second permanent magnet 12. The holders 6 can each be inserted in cylindrical receptacles 7 of the holding device 10 or the housing 5. A holder 6 can also support a field-shaping section 8 made of soft magnetic material, which is arranged next to the second permanent magnet 12 and ensures an optimal course of the field lines.

The holders 6 are accessible from a side of the holding device 10 facing away from the holding surface 9 and are connected to each other and to the actuator 13 via a synchronizing means (common drive rod; see FIG. 3).

Figure 4:
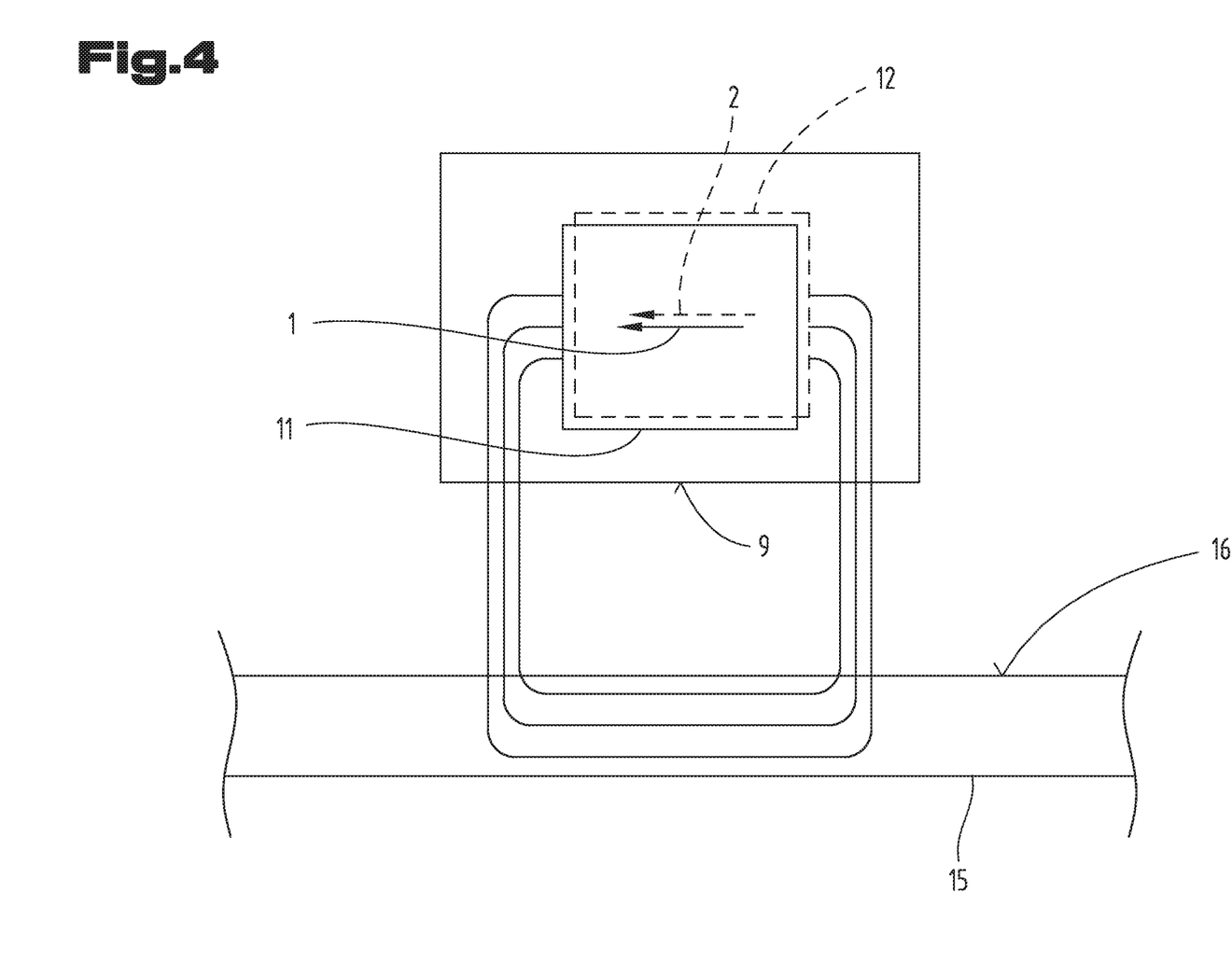
FIG. 4 the principle of the invention based on the first relative position.

In the following, the principle of the invention will be explained in more detail by means of FIGS. 4 and 5. FIG. 4 represents a cut perpendicular to the holding surface 9 and corresponds to the first relative rotational position. The second permanent magnet 12 arranged behind the first permanent magnet 11 in FIG. 4 is shown in dashed lines for reasons of illustration. It can be seen that the field lines outside the holding surface 9 (here: primarily in the counter-pressure element 15) form a circle. The pole directions pointing in the same direction have a strengthening effect on the holding force.

Figure 5:
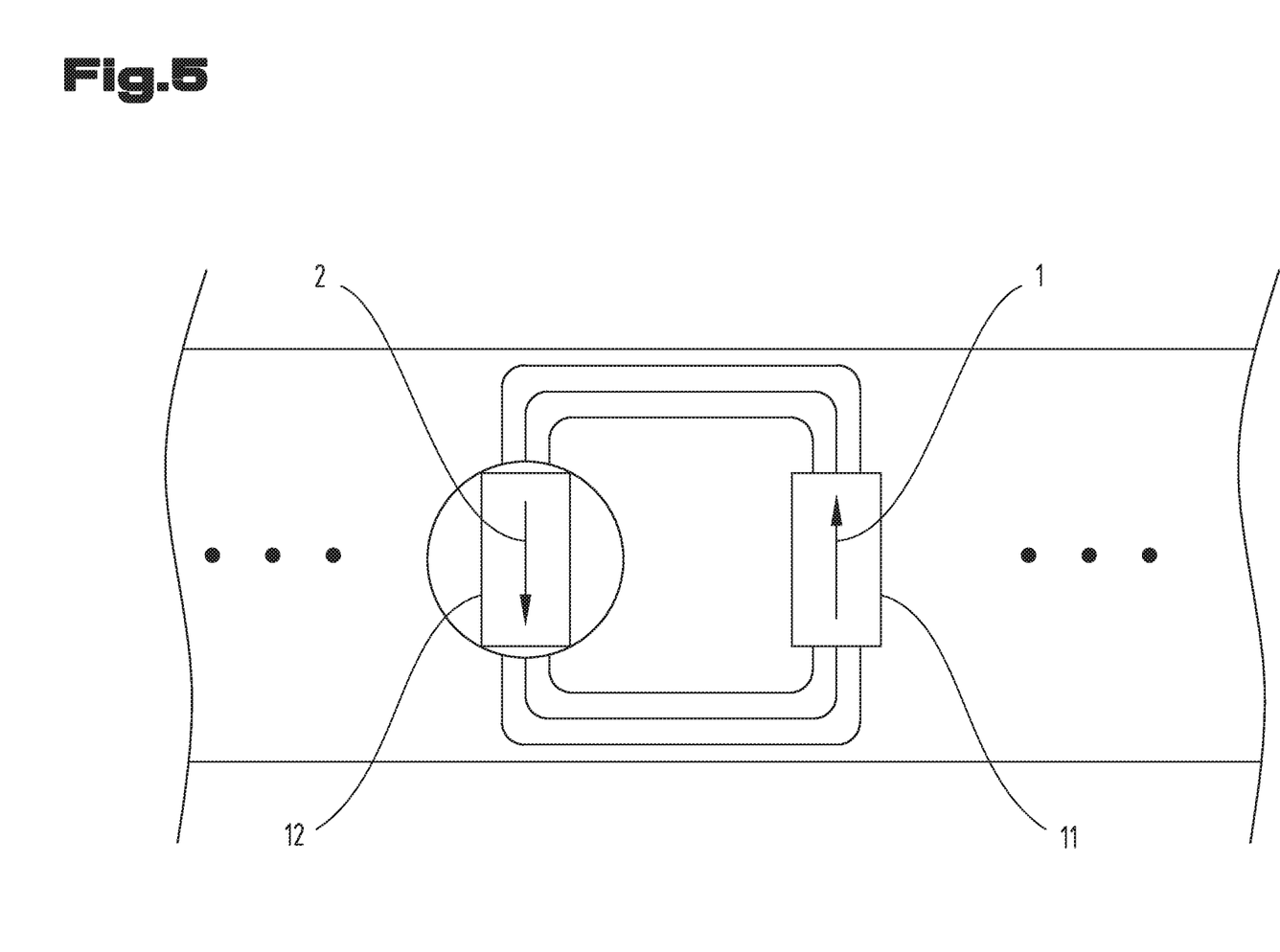
FIG. 5 the principle of the invention based on the second relative position.

FIG. 5 corresponds to the second relative rotational position in which the pole directions 1, 2 of adjacent permanent magnets 11, 12 point in opposite directions. In order to illustrate the flux course, a sectional view parallel to the holding surface 9 was chosen. The field lines now run from the first permanent magnet 11 to the second permanent magnet 12 (arranged directly next to it) in the opposite direction, which results in a magnetic short circuit and the field lines shown in FIG. 4 (largely) disappear outside the holding surface 9.

The holding surface 9 is preferably formed by field-shaping sections of soft magnetic material. In order to generate a high (clamping) force on the workpiece 20 to be fixed, a high magnetic flux density must prevail in the field-shaping sections (forming the holding surface 9). The clamping force is proportional to the square of the magnetic flux density in the respective field-shaping section. When designing a magnet composite, the dimensions of the permanent magnets, in particular their pole faces, and the dimensions of the field-shaping sections, in particular their surface forming the holding surface or facing the holding surface, can be freely and independently selected. By selecting the ratio of the dimensions, in particular the above-mentioned surfaces, of the permanent magnets and field-shaping sections, the clamping force generated by the magnet composite is adjustable. The field-shaping sections, which form the holding surface 9 or sit behind the holding surface, and the field-shaping sections, which are supported by the holders 6, can be matched to each other geometrically.

Figure 6:
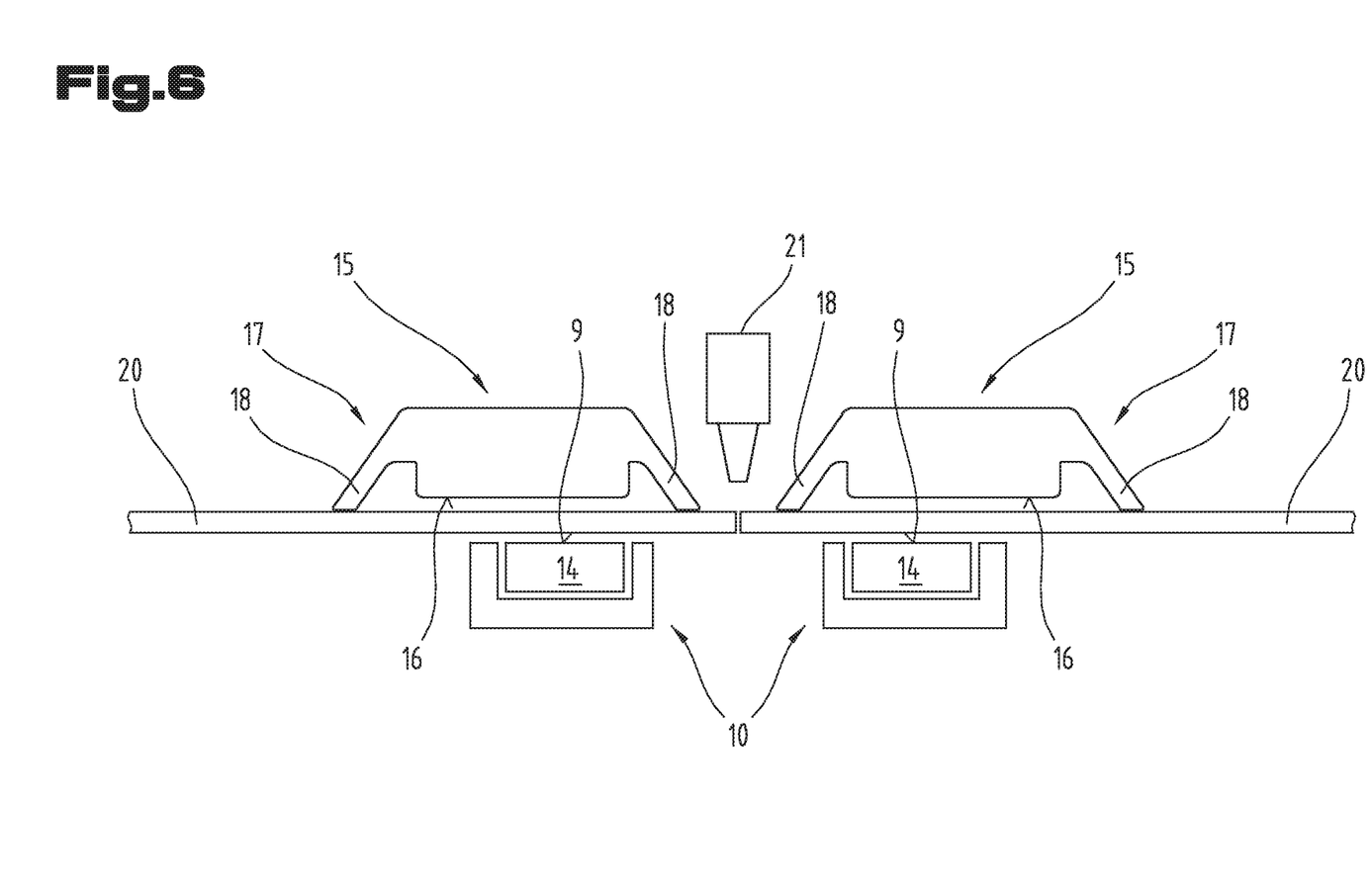
FIG. 6 a clamping device with a counter-pressure element and a clamping profile FIG. 7 a permanent magnet perpendicular to the holding surface FIG. 8 a holding device with centrally arranged permanent magnets, FIG. 9 a holding device with permanent magnets that can be actuated independently of each other.

FIGS. 4 and 6 show an embodiment in which the holding device 10 is a clamping device for clamping a preferably sheet metal shaped object (here: a workpiece 20). A counter-pressure element 15 faces the holding surface 9 with its counter-pressure surface 16 in order to clamp the workpiece 20 in the gap. The counter-pressure element 15 can be made of soft magnetic material and/or comprise a magnet.

FIG. 6 shows that the holding device 10 can be part of a machining device for machining workpieces 20. A machining tool 21 is shown schematically. Two sheet metal workpieces 20 are positioned with their front sides against each other in order to be joined by the machining tool 21 (especially by a welding process). Each workpiece 20 is fixed by a holding device 10. The holding devices 10 can be mechanically connected to each other, for example by a frame or a table, in order to hold the two strip ends in a defined position.

From FIG. 6 it can be seen that the holding device 10 comprises a clamping profile 17 with two preferably diagonally projecting legs 18. The clamping profile 17 is formed on the counter-pressure element 15.

Preferably, the counter-pressure surface 16 should be set back in the direction of its surface normal relative to the ends of the legs 18 (as indicated in FIG. 6), preferably by a maximum of 1 mm, particularly preferably by a maximum of 0.5 mm.

A further aspect is that the magnet arrangement 14 comprising the first magnet arrangement 3 and the second magnet arrangement 4 is arranged asymmetrically (i.e. not centrally) with respect to the clamping profile 17. The distance between the magnet composite 14 and one leg 18 of the clamping profile 17 is greater, preferably 20% greater, than the distance between the magnet composite 14 and the other leg 18. The magnet composite 14 is therefore closer to the leg 18 that fixes the edge of the workpiece (here: the sheet or strip).

Figure 9:
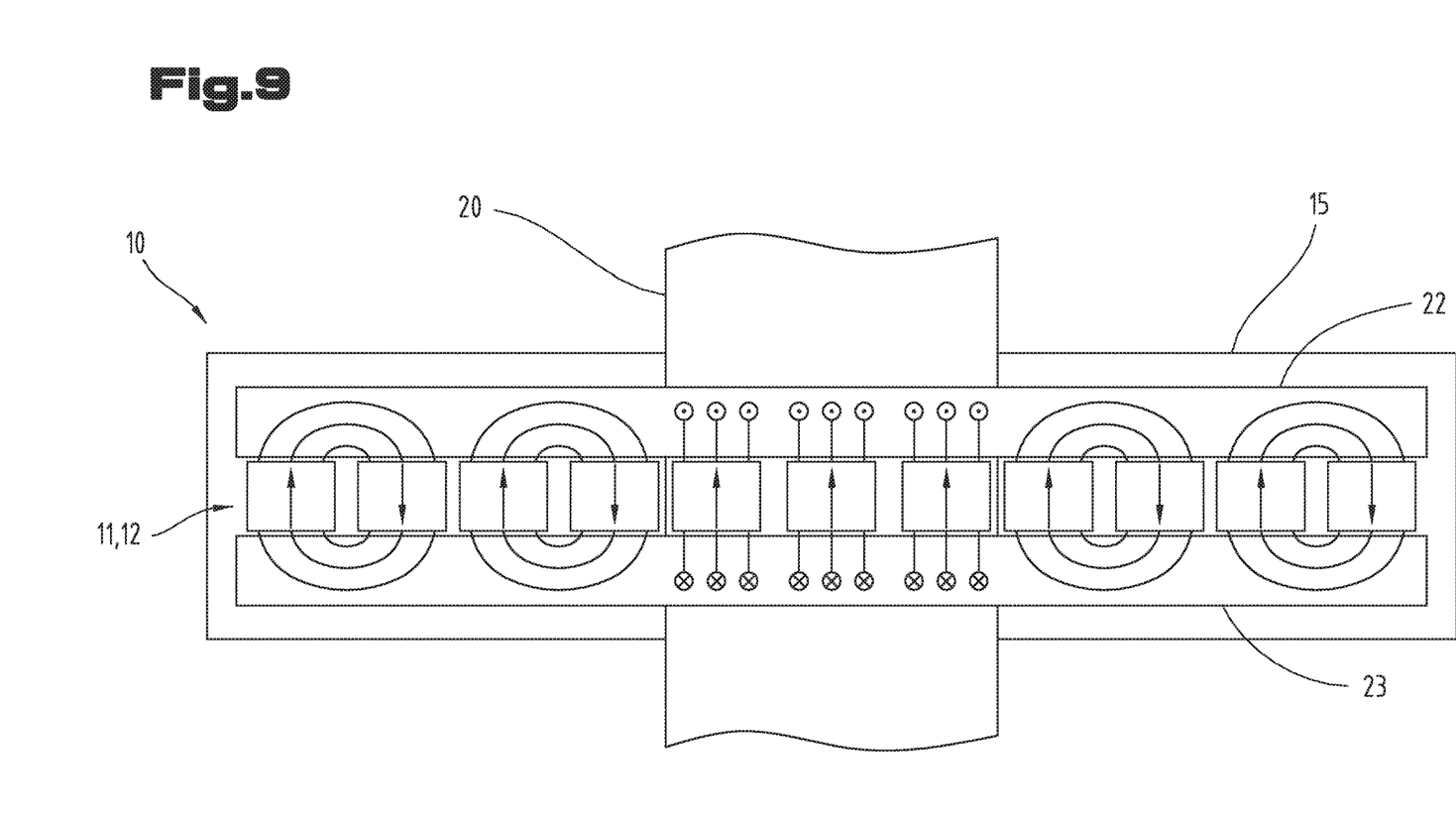

In the following an embodiment is described in more detail, which is characterized by the possibility of partial activation of permanent magnets 11, 12 or permanent magnet units. It has already been mentioned that the second permanent magnets 12 are rotatable independently of each other, preferably by means of independently controllable actuators. Independent control of the permanent magnets 12 enables the setting of different holding forces for different areas of the holding surface 9. In this case, for example, even an area (temporarily not used) may not have any holding force applied to it at all.

Due to different workpiece sizes, in particular different strip widths for strips, it is sometimes necessary to activate only a part of the holding or clamping device. The fixture parts protruding over the workpiece 20 would be tightened so strongly that an inadmissible deformation of the fixture harmful to quality would occur, especially in the edge area of the workpieces.

Figure 8:
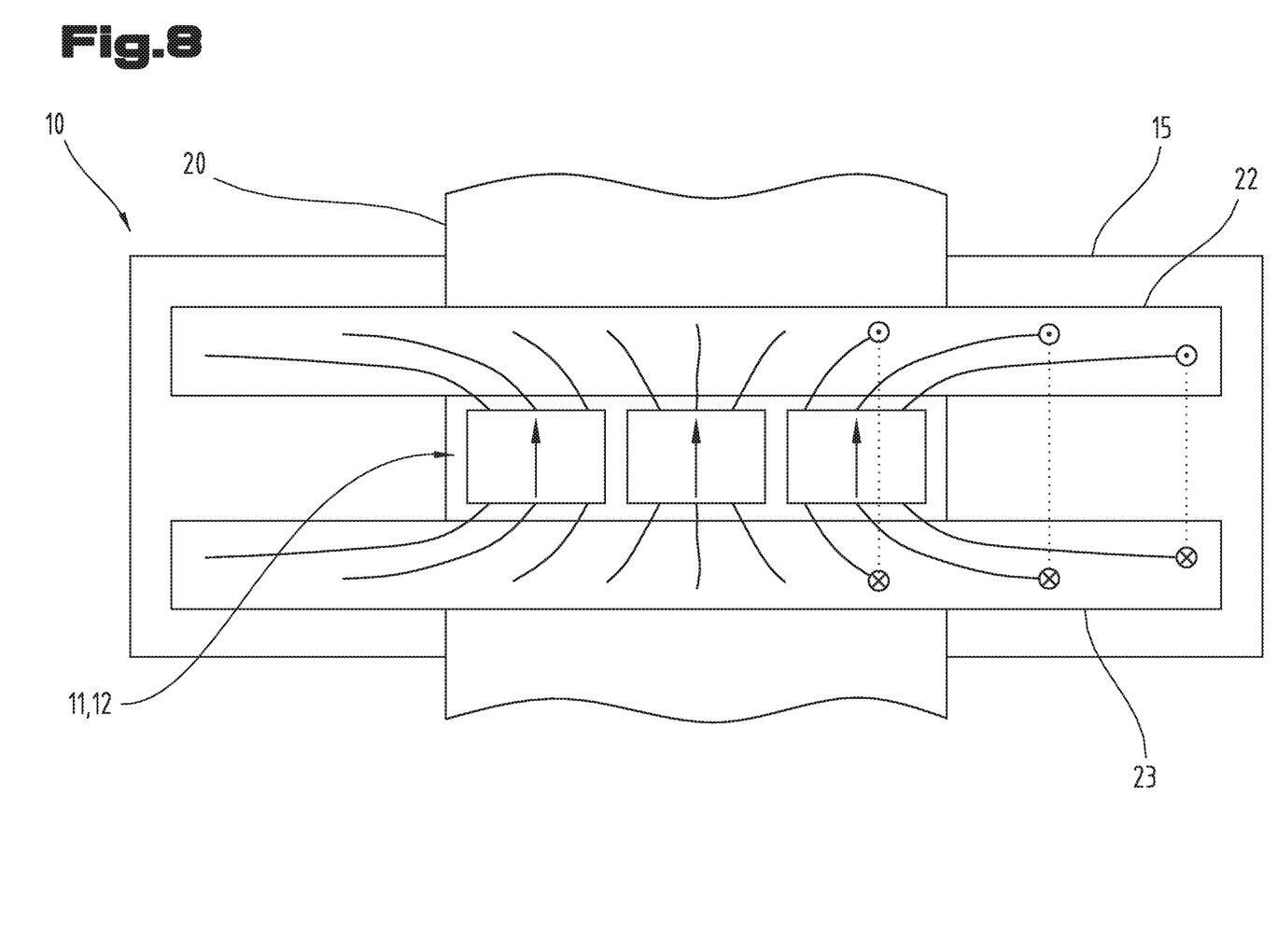

It is preferred if at least one pole shoe 22, 23 extends continuously along the arrangement of the permanent magnets 11, 12, whereby preferably one pole shoe 22, 23 extends continuously on each side of the arrangement of the permanent magnets 11, 12 (FIG. 8). The at least one continuous pole shoe 22, 23 preferably extends along the entire arrangement of the permanent magnets 11, 12.

If only a part of the soft magnetic pole shoes 22, 23 is exposed to magnetic flux from electric or permanent magnets, the magnetic flux return is distributed not only over the area of the workpiece 20 but also over the unoccupied part (FIG. 7). With the disadvantage of an undesired clamping force next to the workpiece 20. Due to the distribution of the source flux over the entire holding surface 9, there is also a reduced magnetic flux density and thus a reduced holding force in the area of the workpiece 20. This is particularly the case when machining a non-magnetic workpiece 20, since the magnetic resistance in the area of the workpiece 20 is just as high as in the adjacent air gap.

An interruption of the pole shoes in the longitudinal direction after each magnet or after each circuit unit by an air gap or a non-magnetic material would prevent the lateral propagation of the magnetic flux and concentrate the holding force on the workpiece. However, interrupting the pole shoes would make it impossible to use the pole shoes as a structural, load-bearing element in the longitudinal direction. An additional, non-magnetic load-bearing element would have to be inserted.

Due to the arrangement according to the invention with the first permanent magnet 11 and the second permanent magnet 12, it is possible to use continuous, supporting pole shoes 22, 23 even with partial wiring, without loss of holding force and without shunt connection in the unoccupied/non-activated area. By increasing the magnetic flux density in the pole shoes 22, 23 with a corresponding ratio of permanent magnet pole area to cross-section of the pole shoes, the pole shoes 22, 23 are in magnetic saturation in the area of the deactivated holding device (FIG. 8). First permanent magnet 11 and second permanent magnet 12 are oppositely aligned.

The magnetic flux runs from the north pole of the first permanent magnet 11 through the pole shoe 22 to the south pole of the second permanent magnet 12 and in the other pole shoe 23 from the north pole of the second permanent magnet 12 to the south pole of the first permanent magnet 11. Since the pole shoes 22, 23 are magnetically saturated in the area of deactivation by the antiparallel aligned permanent magnets 11, 12, they cannot divert any further magnetic flux of the magnets from the activated area. The magnetic flux return and the holding force of the activated magnets (see central area of the holding device 10 in FIG. 8) remain limited to the area of the workpiece 20, even with continuous, constructively supporting pole shoes 22, 23.

The size of the magnets in longitudinal direction can be optimized accordingly. If they are too small, the pole shoe is not in saturation. If they are too large, part of the magnetic flux return must be via the counter-pressure element (or plate) 15 and the device cannot be completely deactivated.

As already stated in the introduction, the invention is not limited to the shown exemplary embodiments. In particular, the number, size, shape, arrangement (in particular their mutual distance) and direction of the permanent magnets may vary. Of course, the (outer) shape of the magnet compound or housing as such could also be different from the embodiment shown.

LIST OF REFERENCE NUMBERS

1 Pole direction
2 Pole direction
3 Rotational axis
4 Direction
5 Housing
6 Holder
7 Receptacle
8 Field-shaping section
9 Holding surface
10 Holding device
11 First permanent magnet
12 Second permanent magnet
13 Actuator
14 Magnet composite
15 Counter-pressure Element
16 Counter-pressure area
17 Clamping profile
18 Leg
19 Displacement direction
20 Work piece
21 Machining tool
22 Pole shoe
23 Pole shoe
24 Pole face
25 Projection surface of a permanent magnet onto the holding surface

The invention claimed is:

1. A machining device for machining workpieces, the machining device comprising at least one machining tool and at least one holding device for temporarily fixing a workpiece, wherein the holding device includes a holding surface, at least one first permanent magnet and at least one second permanent magnet, wherein the second permanent magnet is rotatably mounted relative to the first permanent magnet for rotation about a rotational axis, whereby a pole direction of the second permanent magnet is rotatable relative to a pole direction of the first permanent magnet, and wherein the rotational axis is transverse to the holding surface.

2. The machining device according to claim 1, wherein the holding device comprises at least two of the first permanent magnets and at least two of the second permanent magnets, wherein the second permanent magnets are each rotatably mounted relative to the first permanent magnets, whereby the pole directions of the second permanent magnets are rotatable relative to the pole directions of the first permanent magnets.

3. The machining device according to claim 2, wherein the first permanent magnets and the second permanent magnets are arranged alternately in a direction parallel to the holding surface.

4. The machining device according to claim 3, wherein the rotational axes of the second permanent magnets are parallel to each other.

5. The machining device according to claim 2, wherein the first permanent magnets and the second permanent magnets are arranged one after the other along the direction parallel to the holding surface.

6. The machining device according to claim 2, wherein the second permanent magnets are rotatable independently of each other.

7. The machining device according to claim 2, wherein the first permanent magnets and the second permanent magnets are arranged inside a housing.

8. The machining device according to claim 2, wherein the second permanent magnets are coupled together and rotatable synchronously.

9. The machining device according to claim 1, wherein each second permanent magnet is rotatable relative to the first permanent magnet by at least 90°.

10. The machining device according to claim 1, wherein the pole direction of the first permanent magnet and the pole direction of the second permanent magnet point in a same direction when in a first relative rotational position and in opposite directions when in a second relative rotational position.

11. The machining device according to claim 1, wherein the rotational axis of the second permanent magnet passes through the second permanent magnet.

12. The machining device according to claim 1, wherein the rotational axis of the second permanent magnet is transverse to the pole direction of the second permanent magnet.

13. The machining device according to claim 1, wherein the second permanent magnet is rotatable about the rotational axis between a first rotational position and a second rotational position, and same-named poles of the first and second permanent magnets are closer to one another when in the first rotational position than when in the second rotational position.

14. The machining device according to claim 1, wherein each first permanent magnet is arranged non-rotatably relative to the holding surface and each second permanent magnet is arranged rotatably relative to the holding surface.

15. The machining device according to claim 1, wherein:
the pole direction of each of the first and second permanent magnets is substantially parallel to the holding surface, and/or
at least one first and the at least one second permanent magnets are plates or discs which are substantially perpendicular to the holding surface.

16. The machining device according to claim 1, wherein pole faces of the at least one first permanent magnet and/or pole faces of the at least one second permanent magnet are substantially perpendicular to the holding surface.

17. The machining device according to claim 16, wherein the pole face of at least one of the first and second permanent magnets is larger than a projection area resulting from normal projection of said permanent magnet onto the holding surface.

18. The machining device according to claim 1, wherein a pole shoe extends continuously along the first and second permanent magnets.

19. The machining device according to claim 18, wherein the pole shoe extends continuously along a first side of an entire arrangement of the first and second permanent magnets.

20. The machining device according to claim 19, further comprising a second pole shoe that extends continuously along a second side of the entire arrangement of the first and second permanent magnets opposite the first side.

21. The machining device according to claim 1, wherein the holding device comprises at least one actuator with which the at least one second permanent magnet is rotatable relative to the at least one first permanent magnet.

22. The machining device according to claim 1, wherein the holding device has at least one rotatably mounted holder which holds the at least one second permanent magnet, wherein each rotatably mounted holder is inserted in a cylindrical receptacle of the holding device.

23. The machining device according to claim 22, wherein:
each rotatably mounted holder supports a field-shaping section of soft magnetic material which is arranged next to the second permanent magnet held by said rotatably mounted holder; and/or
each rotatably mounted holder is accessible from a side of the holding device facing away from the holding surface.

24. The machining device according to claim 1, wherein the holding device is a clamping device for clamping an object and further comprises a counter-pressure element having a counter-pressure surface facing the holding surface, wherein the counter-pressure element is formed of soft magnetic material and/or comprises a magnet.

25. The machining device according to claim 24, wherein the holding device comprises a clamping profile with two projecting legs.

26. The machining device according to claim 25, wherein:
the clamping profile is formed on the counter-pressure element, wherein the counter-pressure surface is set back in a direction of its surface normal relative to ends of the legs; and/or
a magnet composite formed by the at least one first permanent magnet and the at least one second permanent magnet is arranged asymmetrically with respect to the clamping profile, wherein the distance of the magnet composite to one leg of the clamping profile is greater than the distance of the magnet composite to the other leg.

27. The machining device according to claim 1, wherein the holding device is a clamping device.

28. The machining device according to claim 1, wherein the rotational axis of each second permanent magnet is substantially perpendicular to the holding surface.

* * * * *